(12) United States Patent
Kim

(10) Patent No.: US 10,211,883 B1
(45) Date of Patent: Feb. 19, 2019

(54) POWER LINE COMMUNICATION SYSTEM OF CLOSED CIRCUIT

(71) Applicants: UNILUX INC., Gyeonggi-do (KR); Jung-Ho Kim, Seoul (KR)

(72) Inventor: Jung-Ho Kim, Seoul (KR)

(73) Assignees: UNILUX INC., Gyeonggi-do (KR); Jung-Ho Kim, Seoul (KR)

( * ) Notice: Subject to any disclaimer, the term of this patent is extended or adjusted under 35 U.S.C. 154(b) by 0 days.

(21) Appl. No.: 15/942,944

(22) Filed: Apr. 2, 2018

(51) Int. Cl.
*H04B 3/00* (2006.01)
*H04B 3/54* (2006.01)

(52) U.S. Cl.
CPC .................................... *H04B 3/54* (2013.01)

(58) Field of Classification Search
CPC ... H04B 3/54; H04L 25/0272; H04L 25/0292; H04L 25/028; H04L 25/08; H04L 7/0008
USPC ................................ 375/257, 316, 219, 295
See application file for complete search history.

(56) References Cited

U.S. PATENT DOCUMENTS

| 2010/0019889 A1* | 1/2010 | Braunshtein | H05B 37/0263 315/159 |
| 2013/0154511 A1* | 6/2013 | Stelzer | H05B 37/0254 315/297 |

\* cited by examiner

*Primary Examiner* — Zewdu A Kassa
(74) *Attorney, Agent, or Firm* — IP Legal Services, LLC

(57) ABSTRACT

The present invention relates to a power line communication system of a closed circuit, which can transmit and receive a large amount of information in a speedy way compared with a conventional technique by creating predetermined information in a method of cutting off the power supplied to the power line near a zero cross of the power while varying the length of the power cut section near the zero cross and assigning information to the varying length and, at the same time, greatly improve a recognition rate and accuracy of a communication signal even for a load of a large capacity by configuring a switch unit by connecting a first switch and a second switch to a transmission unit in parallel and creating and transmitting a communication signal selectively using the switches.

6 Claims, 6 Drawing Sheets

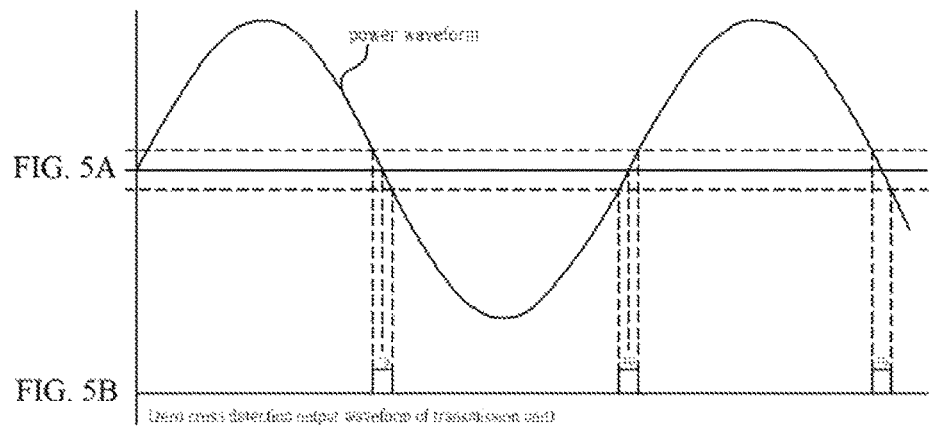
FIG. 5A
FIG. 5B
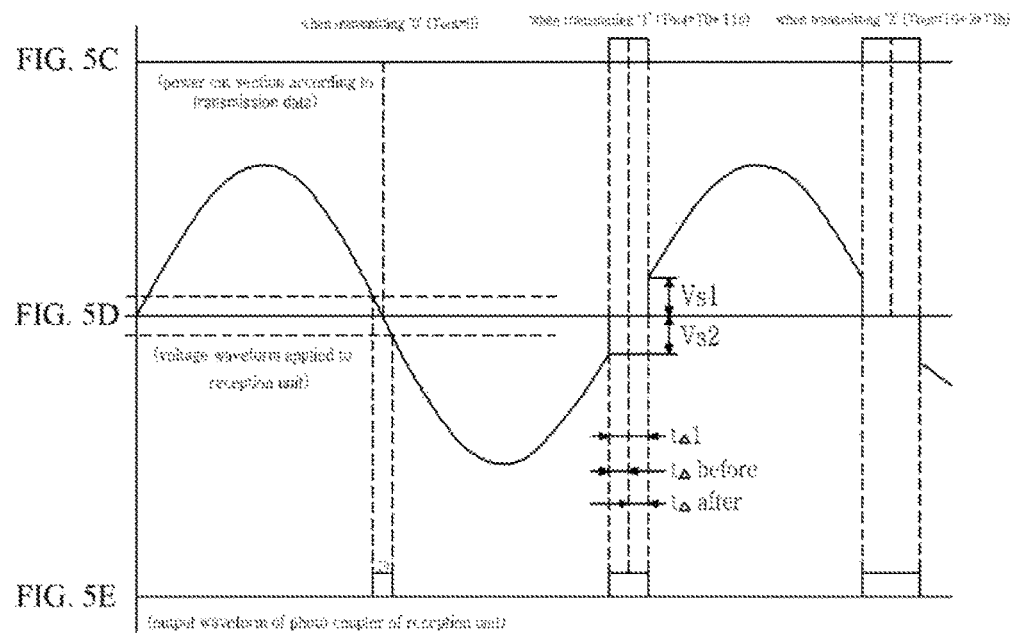
FIG. 5C
FIG. 5D
FIG. 5E

POWER LINE COMMUNICATION SYSTEM OF CLOSED CIRCUIT

BACKGROUND OF THE INVENTION

Field of the Invention

The present invention relates to a power line communication system of a closed circuit, and more specifically, to a power line communication system of a closed circuit, which can transmit and receive a large amount of information in a speedy way compared with a conventional technique by creating predetermined information in a method of cutting off the power supplied to the power line near a zero cross of the power while varying the length of the power cut section near the zero cross and assigning information to the varying length and, at the same time, greatly improve a recognition rate and accuracy of a communication signal even for a load of a large capacity by configuring a switch unit by connecting a first switch and a second switch to a transmission unit in parallel and creating and transmitting a communication signal selectively using the switches.

Background of the Related Art

Most of conventional power line communications transmit an information signal desired to communicate by modulating the information signal and loading the modulated signal on a power line to which a corresponding device is connected.

However, the power line communication method has a problem in that communication reliability is lowered during the operation as it is greatly affected by surrounding environments.

Therefore, to solve such a problem, there is a prior technique related to power line communication of a closed circuit proposed by the inventor of the present invention.

Such a power line communication method is a communication method of a new type completely different from existing power line communications, and particularly, it is a technique proposed to be appropriate to the lighting control field or the like, which does not need high-speed communication and has a small amount of data to transmit.

This will be described with reference to FIGS. 1 and 2.

As shown in FIG. 1, the closed circuit power line communication system is configured of a transmission means 10 installed on one side of a power line P to create a predetermined communication signal and transmit the communication signal through the power line, and a plurality of reception and load means 20 connected to both sides of the power line P in parallel to receive the communication signal transmitted through the power line P and control a corresponding load.

The transmission means 10 includes a transmission control unit 12 for generating a switching signal for creating a power line communication signal, and a switching device 13 installed on one side of the power line P to perform a switching operation by the transmission control unit 12.

The transmission control unit 12 outputs a predetermined switching signal to the switching device 13.

That is, the transmission control unit 12 outputs a switching signal for turning off the switching device 13 during a short time period right after a zero cross of the power waveform as shown in FIG. 2B in synchronization with the waveform of the power (AC) flowing through the switching device 13 as shown in FIG. 2A.

The switching signal of a form as shown in FIG. 2B has a meaning of a communication signal (information).

Accordingly, it is understood that output of the power waveform outputted through the switching device 13 is cut off during a short time period $t_A$ right after the zero cross as shown in FIG. 2C.

Here, if the power waveform is changed to an OFF state during a predetermined time period $t_A$ right after a zero cross from which the next half cycle begins, this is defined as '1', and if the power waveform is changed to an ON state at the moment of beginning the next half cycle right after a zero cross, this is defined as '0'.

Accordingly, FIG. 2B shows a switching signal having information '1011', and the power waveform modified by the switching signal as shown in FIG. 2C is simultaneously applied to a plurality of reception and load means 20 through the power line.

Here, the communication signal '1011' may be changed diversely, and content of the communication signal includes ID information of a corresponding illumination light, as well as information on turning on and off or dimming control of the illumination light, which is a corresponding load.

In addition, although the modified power waveform including the communication information has a section in which the power is turned off during the time period $t_A$, since the time period $t_A$ is extremely short, it does not make any problem overall in supplying a rated power.

A key input unit 11 of the transmission means 10 is a switch for inputting a key signal for controlling an illumination light into the transmission control unit 12, like a wall switch.

Meanwhile, the plurality of reception and load means 20 is a plurality of load devices connected to the closed circuit power line P in parallel and is configured of a signal detection unit 21, a load control unit 22, a power supply unit 23 and an illumination light 24.

Here, the signal detection unit 21 detects a communication signal inputted through the power line P, and the load control unit 22 analyzes the communication signal detected through the signal detection unit 21 and outputs a control signal for turning on and off or dimming the illumination light 24 corresponding to the communication signal to the power supply unit 23.

The power supply unit 23 supplies a driving power to the illumination light 24 under the control of the load control unit 22.

Operation of the reception and load means 20 configured like this will be described with reference to FIG. 2.

By the transmission means 10, a modified power waveform having communication information "1011" as shown in FIG. 2C is inputted into the signal detection unit 21 through the power line P.

The power waveform flowing into the signal detection unit 21 is applied to a light emitting device 21a of a photo coupler PC.

Accordingly, the light emitting device 21a is turned off when the applied power waveform reaches near the zero cross or during the time period $t_A$ of cutting off the power and is turned on in the other portions of the power waveform.

A light receiving device 21b is also turned on or off according to on or off of the light emitting device 21a.

For reference, since the photo coupler PC is a device turned on only when a voltage higher than a threshold voltage is supplied, it is turned off near a zero cross point of the power waveform since a voltage lower than the threshold voltage is applied.

By the on-off operation of the light receiving device 21b, a pulse waveform as shown in FIG. 2D is outputted at the output terminal of the light receiving device 21b.

The output of the photo coupler PC is inputted into the load control unit 22.

The load control unit 22 detects a value inputted from the signal detection unit 21, recognizes a pulse P1, P3 and P4 having a predetermined pulse width as signal '1', recognizes a pulse P2 having a pulse width smaller than the predetermined pulse width as signal '0', and determines the inputted value as a signal having communication information '1011'.

The load control unit 22 determines whether the detected communication signal (information) is a signal for controlling its own illumination light 24 (confirms the ID), and if it is determined that the detected communication signal (information) is a signal for controlling its own illumination light 24, the load control unit 22 outputs a turning on and off or dimming control signal corresponding to the communication signal to change the type of supply of power supplied from the power supply unit 23 to the illumination light 24.

The power line communication system invented by the inventor of the present invention provides many advantages such as accuracy of communication and the like compared with a conventional power line modulation method.

However, the power line communication system has problems as described below.

First, there is a limit in the amount of information due to the communication signal limited based on '0' and '1'.

Second, since current always flowing through a load flows through the switching device 13 of the transmission means 10, the current increases, and particularly, much heat is generated according to the RDSON resistance value when the switching device 13 is turned on.

Due to such phenomena, there is a problem of cost and space of using a semiconductor switching device having a large current capacity and a heat sink of a large scale.

In addition, it is pointed out that there is a problem of losing much electrical energy by heat due to the generated heat.

SUMMARY OF THE INVENTION

Therefore, the present invention has been made in view of the above problems, and it is an object of the present invention to provide a power line communication system of a closed circuit, which can transmit and receive a large amount of information in a speedy way compared with a conventional technique by creating predetermined information in a method of cutting off the power supplied to the power line near a zero cross of the power while varying the length (time) of the power cut section near the zero cross and assigning information to the varying length.

Another object of the present invention is to provide a power line communication system of a closed circuit, which greatly improves a recognition rate and accuracy of a communication signal even for a load of a large capacity by configuring a switch unit by connecting a first switch and a second switch to a transmission unit in parallel and creating and transmitting a communication signal selectively using the switches.

Another object of the present invention is to provide a power line communication system of a closed circuit, which greatly improves a recognition rate and accuracy of a communication signal by creating, to create the communication signal, a pulse signal having a comparatively large pulse width for a communication signal in a method of cutting off the power near the zero cross of a power waveform.

To accomplish the above objects, according to one aspect of the present invention, there is provided a power line communication system of a closed circuit, the system comprising: a transmission unit for cutting off power supplied to a power line in an area near a zero cross of the power to create and transmit a lighting apparatus control signal while varying a length of a power cut section Tcut of the area near the zero cross and assigning information to the varying length; and a lighting apparatus for extracting and analyzing lighting apparatus control information transmitted through the transmission unit and controlling a corresponding lamp, wherein the power cut section Tcut further cuts off the power for a predetermined time in one or both sides of + side and − side from the area near the zero cross.

In addition, according to the present invention, the information assigned to the length of the power cut section Tcut is assigned in a form such that Tcut=0 in case of data '0', Tcut=T0+T1b in case of data '1', where T0 is a length of a section in which a second zero crossing detection unit of the lighting apparatus is turned off when a voltage lower than a threshold voltage is applied, and T1b is a length of the power cut section Tcut when a data value increases by '1', Tcut=T0+(2×T1b) in case of data '2', and Tcut=T0+(X× T1b) in case of data 'X'.

In addition, according to the present invention, the transmission unit includes: a first zero crossing detection unit for detecting a zero cross time point of power (AC) of the power line; a control unit for cutting off the power supplied to the power line in the area near the zero cross of the power by controlling switching of a switch unit while varying the length of the power cut section Tcut of the area near the zero cross in correspondence to the lighting apparatus control signal; and the switch unit installed on one side of the power line connected to the lighting apparatus to perform a switching operation by the control unit.

In addition, according to the present invention, the switch unit is configured by connecting a first switch and a second switch in parallel, and the control unit performs output control of turning off the first switch and turning on the second switch when power line communication is not performed, and controls to turn off the second switch and output a switching signal for a communication signal to the first switch when power line communication is performed.

In addition, according to the present invention, the first switch is configured of one switching device in case of a bi-directional semiconductor switching device such as a TRIAC, configured by connecting two switching devices in series in case of a switching device such as a FET (or an IGBT) embedded with a backward diode, or configured by connecting two switching devices in parallel in case of a unidirectional semiconductor switching device (an IGBT or the like not embedded with a backward diode).

In addition, according to the present invention, the second switch is configured of a relay switching device.

In addition, according to the present invention, the lighting apparatus includes: a reception unit for detecting a zero cross point of the power, extracting the lighting apparatus control signal transmitted through the transmission unit, and controlling a lamp unit by analyzing a command corresponding to the signal; and the lamp unit for controlling turning on and off or dimming of an LED lamp under the control of the reception unit.

BRIEF DESCRIPTION OF THE DRAWINGS

FIGS. 5A to 5E are views showing an output power waveform of a power line communication system of a closed circuit according to the present invention.

DESCRIPTION OF SYMBOLS

Figure 1:
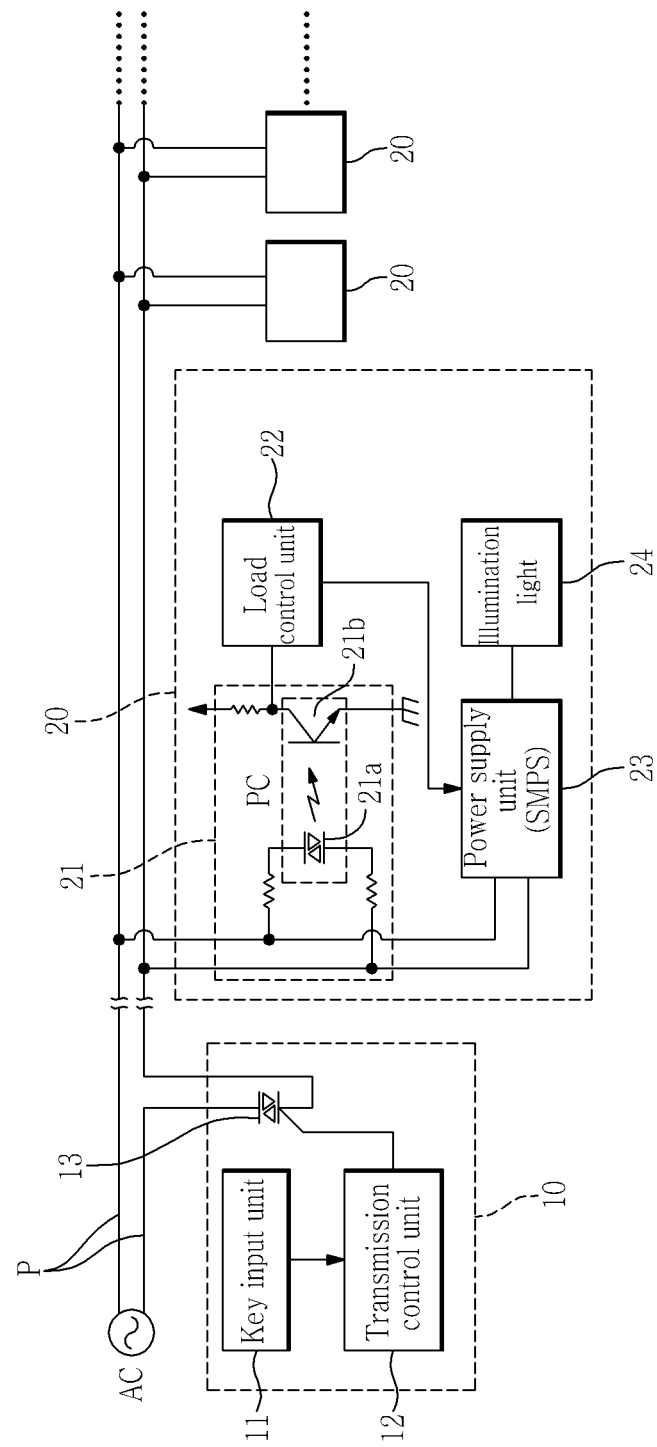
FIG. 1 is a view showing the configuration of a conventional power line communication system.

100: transmission unit
110: first zero crossing detection unit
120: control unit
130: switch unit
131.131A: first switch
132: second switch
140: communication unit
200: lighting apparatus
210: reception unit
211: second zero crossing detection unit
212: data extraction unit
213: signal analysis unit
214: lighting apparatus control unit
220: lamp unit
221: power supply unit
222: LED lamp

DETAILED DESCRIPTION OF THE PREFERRED EMBODIMENT

Hereafter, the preferred embodiments of the invention will be described in detail with reference to the accompanying drawings.

Figure 3:
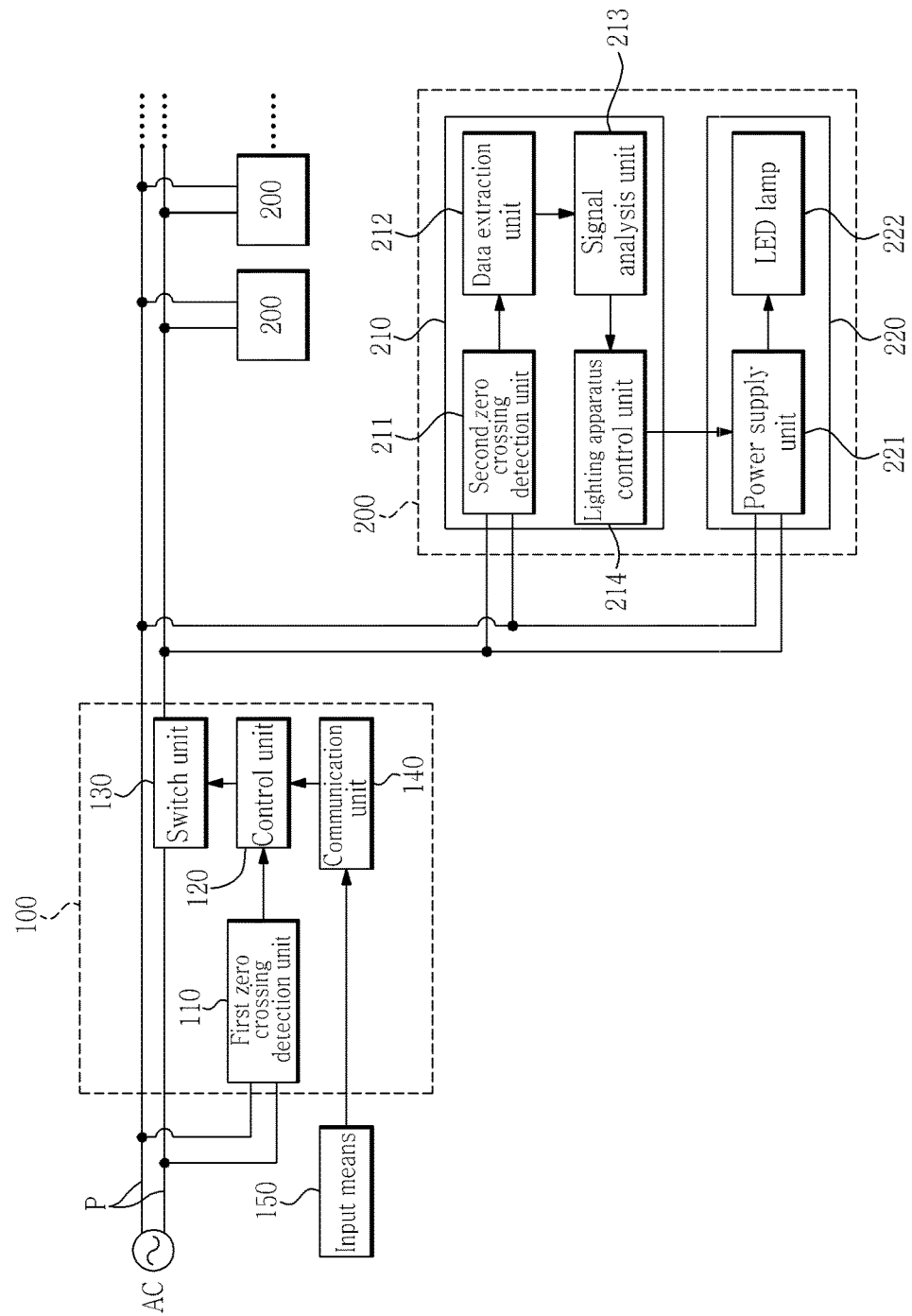
FIG. 3 is a block diagram showing a power line communication system of a closed circuit according to the present invention.
Figure 4:
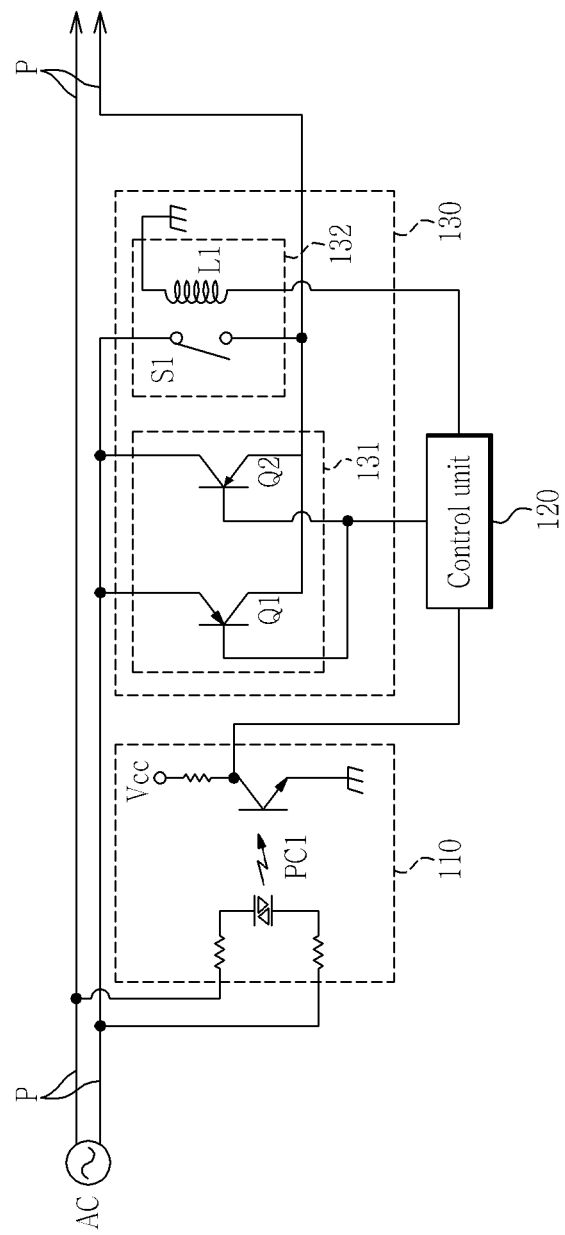
FIG. 4 is a detailed circuit diagram of a transmission unit according to the present invention.

FIG. 3 is a block diagram showing a power line communication system of a closed circuit according to the present invention, and FIG. 4 is a detailed circuit diagram of a transmission unit according to the present invention.

As shown in the figures, a power line communication system of a closed circuit according to the present invention includes a transmission unit 100 connected to one side of a power line P, to which a lighting apparatus 200 is connected, to create a lighting apparatus control signal and transmit the control signal through the power line P, and the lighting apparatus 200 for extracting the lighting apparatus control signal transmitted through the transmission unit 100 and controlling a corresponding lamp.

In order to create and transmit the lighting apparatus control signal, the transmission unit 100 cuts (OFF) the power supplied to the power line P in an area near a zero cross of the power while varying the length of the power cut section Tcut of the area near the zero cross and performs a function of assigning information to the varying length.

The transmission unit 100 includes a first zero crossing detection unit 110, a control unit 120, a switch unit 130 and a communication unit 140.

The first zero crossing detection unit 110 detects a zero crossing time point of the power (AC) of the power line P and inputs the zero crossing time point into the control unit 120.

The first zero crossing detection unit 110 may be configured as a circuit using a first photo coupler PC1 as shown in FIG. 4, and output of the first photo coupler PC1 is inputted into the control unit 120.

The control unit 120 cuts (OFF) (hereinafter, also referred to as 'cut') the power supplied to the power line P in an area near a zero cross of the power by controlling switching of the switch unit 130 while varying the length of the power cut section Tcut of an area near the zero cross in correspondence to the lighting apparatus control signal.

First, when data '0' is to be transmitted, it is controlled not to generate a power cut section Tcut in an area near a zero cross T0 of the power (AC) as shown in FIGS. 5C and 5D.

That is, Tcut becomes 0.

When data '1' is to be transmitted, power is cut off to adjust the power cut section Tcut to have a length of T0+T1b in an area near a zero cross of the power (AC).

That is, Tcut becomes T0+T1b.

Here, T0 is the length of a section in which a photo coupler, which is a second zero crossing detection unit 211 of the lighting apparatus 200 described below, is turned off when a voltage lower than a threshold voltage is applied, and T1b is the length of the power cut section when the data value increases by '1'.

In addition, although T1b is preferably configured as a sum of equal lengths corresponding to data '1' in both directions of + side and − side from an area near the zero cross, it may be configured to further skew the section to the + side or the − side, and the added length only needs to be equal to T1b.

The configuration of the length of T1b is applied to the following descriptions in the same manner.

Figure 2:
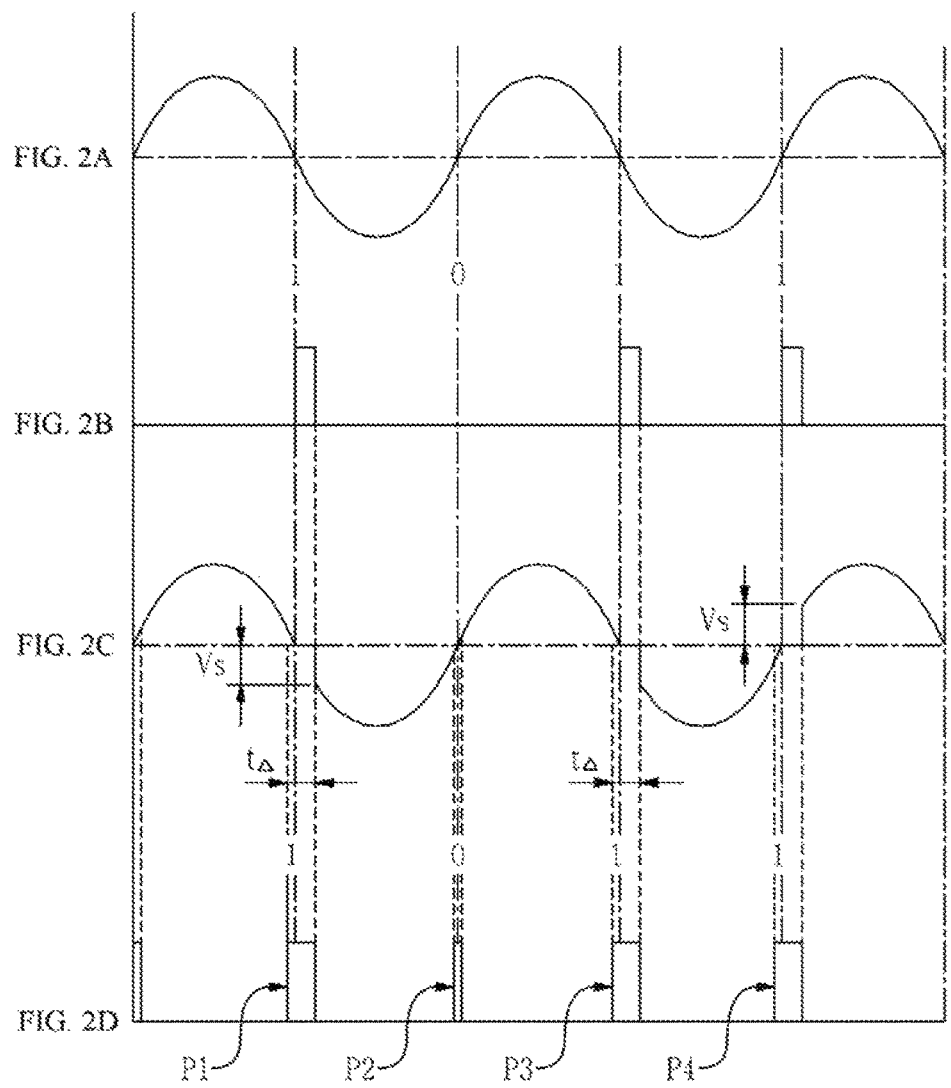
FIGS. 2A to 2D are views showing an output power waveform of FIG. 1.

Specifically, in creating a modified power waveform including communication information ('012') as shown in FIG. 5D, since the power waveform is cut off during a short time period $t_{A1}$ before and after a zero cross, switching noise is not generated as the voltages $V_{s1}$ and $V_{s2}$ at the time points of turning on and turning off the semiconductor device of the switch unit 130 are low, and at the same time, the pulse width of the pulse signal for the communication signal increases wider as the time period $t_{A1}$ is larger than the time period of the pulse width ($t_A$: FIG. 2C) of the prior art.

Accordingly, since a pulse signal having a comparatively large pulse width is created for a communication signal, the present invention greatly improves the recognition rate and accuracy of the communication signal.

If the time span from the moment of turning off the semiconductor switching device before reaching a zero cross to the moment of reaching the zero cross is $t_{\Delta before}$ and the time span from the zero cross to the moment of turning on the switching device is $t_{\Delta after}$, $t_{\Delta before}$ and $t_{\Delta after}$ may be arbitrarily adjusted between 0 and a predetermined time.

As a result, $V_{S1}$ and $V_{S2}$ may be adjusted between 0V and a predetermined voltage. This adjustment may be selectively determined according to a used device.

When data '2' is to be transmitted, power is cut off to adjust the power cut section Tcut to have a length of T0+(2×T1b) in an area near a zero cross of the power (AC).

That is, Tcut becomes T0+2T1b.

In the same manner, when data 'X' is to be transmitted, power is cut off to adjust the power cut section Tcut to have a length of T0+(X×T1b) in an area near a zero cross of the power (AC).

Compared with a conventional technique which transmits only one bit (0 or 1) (on or off) at the points of zero cross, the present inventions provides the advantage of transmitting several bits at the points of zero cross.

For example, if a length of sixteen steps can be identified at one zero cross point, four bits can be transmitted.

Until present, four cycles of power frequency are needed to transmit information of eight bits, and a time of 4/60 seconds is required when the power frequency is 60 Hz. However, in the present invention, since it is four times faster, only one cycle is needed, and the communication time becomes 1/60 seconds.

That is, the present invention may improve the response speed much faster and provides excellent performance in controlling a plurality of lighting apparatuses.

The switch unit 130 is installed on one side of the power line P connected to the lighting apparatus 200 and performs a switching operation by the control unit 120.

The switch unit 130 is configured to connect a first switch 131 and a second switch 132 in parallel.

The first switch 131 is configured by connecting two semiconductor switching devices in parallel.

The first switch 131 is configured to interpose the emitter and the collector of a first transistor Q1, which is a semiconductor switching device, at one side of the power line P, configured to connect the collector and the emitter of a second transistor Q2 to the emitter and the collector of the first transistor Q1 in parallel, and configured to simultaneously apply the output of the control unit 120 to the bases of the first transistor Q1 and the second transistor Q2.

The second switch 132 is configured of a relay switching device and driven to be turned on or off by the output of the control unit 120.

The switch unit 130 performs a switching operation under the control of the control unit 120, and if power is cut off to create and transmit a lighting apparatus control signal through the power line P, i.e., in case of performing communication, the first switch 131 is turned on and the second switch 132 is turned off so that the power (AC) may flow only through the first switch 131.

In addition, when the communication is not performed, the second switch 132 is turned on and the first switch 131 is turned off so that the power (AC) may flow only through the second switch 132 to prevent generation of heat from the semiconductor switching device.

The first switch 131 may also be configured of a TRIAC (TC).

That is, the first switch 131 is configured of one switching device in the case of a bi-directional semiconductor switching device such as a TRIAC (TC) or configured by connecting two switching devices in parallel in the case of a unidirectional switching device such as a transistor, a FET, an IGBT or the like.

Figure 6:
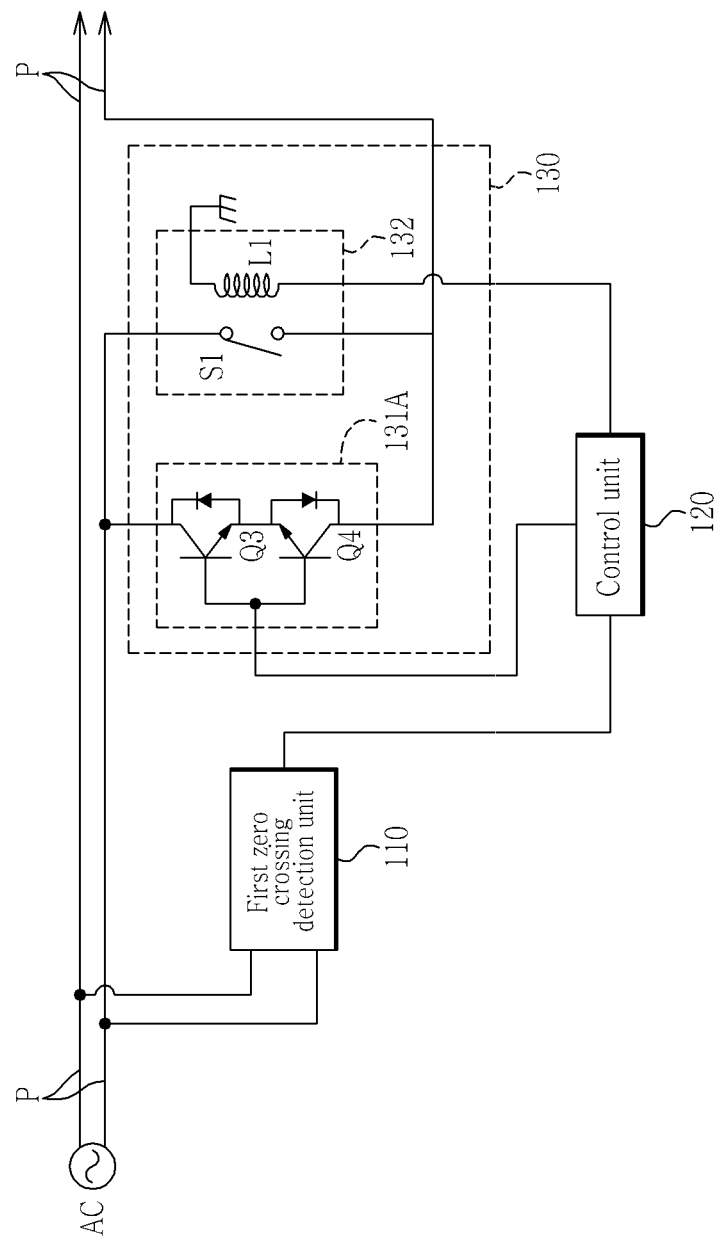
FIG. 6 is a view showing another embodiment of a switch unit according to the present invention.

In addition, according to another embodiment of the present invention, the first switch 131A of the switch unit 130 may be configured by connecting semiconductor devices such as a third transistor Q3 and a fourth transistor Q4 in series as shown in FIG. 6.

The communication unit 140 receives a lighting apparatus control key signal inputted from various input means and transmits the signal to the control unit 130.

The input means 150 for generating the lighting apparatus control key signal may be a switch input means such as a wall switch, a short distance infrared reception sensor or a PC installed in a room, and they issue a dimming signal, in addition to a turn on or off signal, to a corresponding lighting apparatus 200.

Meanwhile, the lighting apparatus 200 includes a reception unit 210 for detecting a zero cross of power, extracting a lighting apparatus control signal transmitted through the transmission unit 100, and controlling a lamp unit 220 by analyzing a command corresponding to the signal, and the lamp unit 220 for controlling turning on and off or dimming of an LED lamp 222 under the control of the reception unit 210.

More specifically, the reception unit 210 is configured of a second zero crossing detection unit 211, a data extraction unit 212, a signal analysis unit 213 and a lighting apparatus control unit 214.

The second zero crossing detection unit 211 is connected to the power line P and detects a zero cross time point of power (AC).

In addition, the second zero crossing detection unit 211 is configured of a photo coupler, like the first zero crossing detection unit 110, and although there is no power cut section, if a voltage lower that the threshold voltage of the photo coupler is applied around a low voltage, there is a section in which the output of the photo coupler is turned off.

This section is defined before as T0 section.

The data extraction unit 212 extracts the communication signal (data) included in the cross zero time point inputted from the second zero crossing detection unit 211.

The signal analysis unit 213 recognizes a command by analyzing the communication signal inputted through the data extraction unit 212 and inputs the command into the lighting apparatus control unit 214.

The lighting apparatus control unit 214 controls the lamp unit 220 according to the lighting apparatus control command inputted from the signal analysis unit 213.

The lamp unit 220 is configured of a power supply unit 221 and an LED lamp 222, and the power supply unit 221 controls turning on and off or dimming of the LED lamp 222 by increasing or decreasing the current supplied to the LED lamp 222 under the control of the lighting apparatus control unit 214.

The overall operation of the present invention configured like this will be described.

First, the transmission unit 100 and at least one or more lighting apparatus 200 are installed on the power line P of a system.

For example, a case of turning on a specific LED lamp 222 installed on the ceiling by pressing a wall switch of a certain room will be described.

If the wall switch, i.e., an input means 150, is pressed, a control signal for turning on and off or dimming the lighting apparatus is generated and inputted into the control unit 120 through the communication unit 140 of the transmission unit 100.

The control unit 120 outputs a switching signal to the switch unit 130 to generate a lighting apparatus control signal corresponding to a key signal inputted through the communication unit 140.

At this point, the control unit 120 cuts off power from the relay coil L1 of the second switch 132. Accordingly, the relay switch S1 is turned off, and the second switch is turned off, and at the same time, the first switch S1 is turned on, and power (AC) flows only through the first switch 131, i.e., the first and second transistors Q1 and Q2.

In this state, the control unit 120 detects a zero cross time point inputted through the first zero crossing detection unit 110 and performs a switching control to generate a control signal for a corresponding lighting apparatus.

That is, the control unit 120 outputs a switching signal to the bases of the first and second transistors Q1 and Q2 to create a power cut time (length), i.e., a power cut section Tcut, having a data that can be identified in an area near a zero cross.

In addition, the length of the power cut section Tcut is implemented in the form as shown in FIGS. 5C and 5D and has communication information for controlling a corresponding LED lamp.

Like this, the lighting apparatus control signal created by the switch unit 130 is transmitted to the lighting apparatus 200 through the power line P, received and extracted through the second zero crossing detection unit 211 of the reception unit 210, and analyzed as a command for turning on and off or dimming a corresponding LED lamp through the data extraction unit 212 and the signal analysis unit 213.

The lighting apparatus control unit 214 receiving the information from the signal analysis unit 213 turns on the corresponding LED lamp 222 by controlling the power supply unit 221 of the lamp unit 220.

The present invention provides an advantage of transmitting and receiving a large amount of information in a speedy way compared with a conventional technique by creating predetermined information in a method of cutting off the power supplied to the power line near a zero cross of the power while varying the length (time) of the power cut section near the zero cross and assigning information to the varying length.

In addition, the present invention provides an advantage of greatly improving a recognition rate and accuracy of a communication signal even for a load of a large capacity by configuring a switch unit by connecting a first switch and a second switch to a transmission unit in parallel and creating and transmitting a communication signal selectively using the switches.

What is claimed is:

1. A power line communication system of a closed circuit, the system comprising:
    a transmission unit for cutting off power supplied to a power line P in an area near a zero cross of the power to create and transmit a lighting apparatus control signal while varying a length of a power cut section Tcut of the area near the zero cross and assigning information to the varying length; and
    a lighting apparatus for extracting and analyzing lighting apparatus control information transmitted through the transmission unit and controlling a corresponding lamp, wherein
    the power cut section Tcut further cuts off the power for a predetermined time in one or both sides of + side and − side from the area near the zero cross,
    wherein the information assigned to the length of the power cut section Tcut is assigned in a form such that Tcut=0 in case of data '0', Tcut=T0+T1b in case of data '1', where T0 is a length of a section in which a second zero crossing detection unit of the lighting apparatus is turned off when a voltage lower than a threshold voltage is applied, and T1b is a length of the power cut section Tcut when a data value increases by '1', Tcut=T0+(2×T1b) in case of data '2', and Tcut=T0+(X×T1b) in case of data 'X'.

2. The system according to claim 1, wherein the transmission unit includes:
    a first zero crossing detection unit for detecting a zero cross time point of power (AC) of the power line P;
    a control unit for cutting off the power supplied to the power line P in the area near the zero cross of the power by controlling switching of a switch unit while varying the length of the power cut section Tcut of the area near the zero cross in correspondence to the lighting apparatus control signal; and
    the switch unit installed on one side of the power line P connected to the lighting apparatus to perform a switching operation by the control unit.

3. The system according to claim 2, wherein the switch unit is configured by connecting a first switch and a second switch in parallel, and the control unit performs output control of turning off the first switch and turning on the second switch when power line communication is not performed, and controls to turn off the second switch and output a switching signal for a communication signal to the first switch when the power line communication is performed.

4. The system according to claim 3, wherein the first switch is configured of one switching device in case of a bi-directional semiconductor switching device, configured by connecting two switching devices in parallel in case of a unidirectional semiconductor switching device, or configured by connecting two switching devices in series in case of a switching device embedded with a backward diode.

5. The system according to claim 3, wherein the second switch is configured of a relay switching device.

6. The system according to claim 1, wherein the lighting apparatus includes:
    a reception unit for detecting a zero cross point of the power, extracting the lighting apparatus control signal transmitted through the transmission unit, and controlling a lamp unit by analyzing a command corresponding to the signal; and
    the lamp unit for controlling turning on and off or dimming of an LED lamp under the control of the reception unit.

* * * * *